(12) United States Patent
Baughman et al.

(10) Patent No.: US 9,348,508 B2
(45) Date of Patent: May 24, 2016

(54) AUTOMATIC DETECTION OF USER PREFERENCES FOR ALTERNATE USER INTERFACE MODEL

(75) Inventors: Aaron K. Baughman, Silver Spring, MD (US); David W. Buchanan, Ossining, NY (US); Robert G. Farrell, Cornwall, NY (US); Aditya A. Kalyanpur, Westwood, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 43 days.

(21) Appl. No.: 13/396,792

(22) Filed: Feb. 15, 2012

(65) Prior Publication Data

US 2013/0212542 A1  Aug. 15, 2013

(51) Int. Cl.
| | |
|---|---|
| *G06F 3/00* | (2006.01) |
| *G06F 3/0488* | (2013.01) |
| *G06F 3/041* | (2006.01) |
| *G06F 3/0487* | (2013.01) |
| *G06F 9/44* | (2006.01) |
| *G06F 3/0481* | (2013.01) |
| *G06F 11/34* | (2006.01) |

(52) U.S. Cl.
CPC ............ *G06F 3/04883* (2013.01); *G06F 3/041* (2013.01); *G06F 3/0481* (2013.01); *G06F 3/0487* (2013.01); *G06F 9/4443* (2013.01); *G06F 11/3438* (2013.01)

(58) Field of Classification Search
CPC .......... G06F 9/4443; G06F 8/34; G06F 8/38; G06F 3/017; G06F 2203/04807
USPC .............................. 715/866, 744, 863; 706/11
See application file for complete search history.

(56) References Cited

U.S. PATENT DOCUMENTS

| 7,987,003 B2 | 7/2011 | Hoffberg et al. |
|---|---|---|
| 2001/0017632 A1 | 8/2001 | Goren-Bar |

(Continued)

FOREIGN PATENT DOCUMENTS

| CN | 102246116 A | 11/2011 |
|---|---|---|
| WO | 2006128295 A1 | 12/2006 |
| WO | 2011087816 A1 | 7/2011 |

OTHER PUBLICATIONS

Alia, et al., "A Utility-based Adaptivity Model for Mobile Application", 21st International Conference on Advanced Information Networking and Applications Workshops (2007 IEEE); 8 pages.

(Continued)

*Primary Examiner* — Kieu Vu
*Assistant Examiner* — Joy M Weber
(74) *Attorney, Agent, or Firm* — Cantor Colburn LLP; Nidhi Kisson

(57) ABSTRACT

A method for automatic detection of user preferences for alternate user interface model includes operating a digital device with an active user interface model and receiving one or more input signals from a user of the digital device. The method includes comparing the one or more input signals with one or more latent user interface models and determining if one of the latent user interface models has a higher likelihood given the one or more input signals than the active user interface models. The method also includes responsively substituting the latent user interface with the highest likelihood given the one or more input signals for the active user interface model.

19 Claims, 4 Drawing Sheets

(56) References Cited

U.S. PATENT DOCUMENTS

| | | | |
|---|---|---|---|
| 2004/0064597 A1* | 4/2004 | Trewin | 710/8 |
| 2006/0190822 A1 | 8/2006 | Basson et al. | |
| 2010/0153313 A1* | 6/2010 | Baldwin et al. | 706/11 |
| 2011/0093820 A1* | 4/2011 | Zhang et al. | 715/863 |
| 2012/0096637 A1* | 4/2012 | LaFlamme et al. | 4/559 |
| 2012/0192117 A1* | 7/2012 | Migos | G06F 17/241 715/863 |
| 2013/0120280 A1* | 5/2013 | Kukulski | G06F 3/04883 345/173 |
| 2013/0293504 A1* | 11/2013 | Heinrich | G06F 3/017 345/173 |

OTHER PUBLICATIONS

Fink, et al., "A Review and Analysis of Commercial User Modeling Servers for Personalization on the World Wide Web", (c) 2000 Kluwer Academic Publishers, User Modeling and User-Adapted Interaction 10, pp. 209-249.

Gao, et al., "A User Requirement-driven Service Dynamic Personalized QoS Model", 2010 Third International Conference on Dependability, College of Information Science and Engineering; Northeastern University; Shenyang, China, 2010 IEEE, pp. 17-23.

Garzon et al., "Model-based Personalization within an Adaptable Human-Machine Interface Environment that is Capable of Learning from User Interactions", 2010 IEEE, IEEE Computer Society, pp. 191-198.

Kernchen et al., "Adaptivity for Multimodal User Interfaces in Mobile Situations", 2005 IEEE, CCSR—The University of Surrey, Guildford, GU2 7XH, UK, pp. 469-472.

Lee et al., "Gestures for Mixed-Initiative News Video Browsing on Mobile Devices", MM09, Oct. 19-24, 2009, Beijing, China, pp. 1011-1012.

Mukhi et al., "Cooperative Middleware Specialization for Service Oriented Architectures", WWW2004, May 17-22, 2004, pp. 206-215.

* cited by examiner

AUTOMATIC DETECTION OF USER PREFERENCES FOR ALTERNATE USER INTERFACE MODEL

BACKGROUND

The present invention relates to user interfaces for digital devices, and more specifically, to automatic detection of a user preference for an alternative user interface model.

Recently people have begun to interact with and utilize a wide variety of digital devices throughout their everyday lives. These digital devices include, but are not limited to, cellular phones, personal data assistants (PDAs), e-readers, tablet computers, netbooks, self-service kiosks, and the like. Each of these digital devices includes a user interface model which defines the way that the users interact with the device. Some digital devices may include more than one user interface model that the users are able to select between. Generally, a user interface model is a mapping or correlation of inputs received from a user interface to actions or activities on the digital device.

In general, people have their own mental models of how a digital device should react to various inputs from the user interface. For example, a user might envision pages of a virtual book on an electronic reader or tablet computer as organized from left-to-right. Such a user would likely expect to move to the next page by pushing or sliding the current page from right-to-left. However, other people might bring different mental models to the same devices. For example, another user might see the pages as organized from top-to-bottom, and expect a downward push or slide to lead to the next page. Such differences mean that many existing user interface models can be confusing or frustrating for at least a portion of the users of the digital device. Currently, the user can only overcome this conflict by adapting to the existing user interface model of the device or by changing the user interface model of the device to more closely align with the user's mental model.

SUMMARY

According to exemplary embodiments, a method for automatic detection of user preferences for an alternate user interface model includes operating a digital device with an active user interface model and receiving one or more input signals from a user of the digital device. The method includes comparing the one or more input signals with one or more latent user interface models and determining if one of the latent user interface models has a higher likelihood given the one or more input signals than the active user interface models. The method also includes responsively substituting the latent user interface with the highest likelihood given the one or more input signals for the active user interface model.

According to further exemplary embodiments, a computer program product for automatic detection of user preferences for an alternate user interface model includes a tangible storage medium readable by a processing circuit and storing instructions for execution by the processing circuit for performing a method. The method operating a digital device with an active user interface model and receiving one or more input signals from a user of the digital device. The method includes comparing the one or more input signals with one or more latent user interface models and determining if one of the latent user interface models has a higher likelihood given the one or more input signals than the active user interface models. The method also includes responsively substituting the latent user interface with the highest likelihood given the one or more input signals for the active user interface model.

A method for automatic detection of user preferences for an alternate user interface model includes operating a user interface with an active user interface model and receiving one or more input signals from a user of the digital device. The method also includes calculating the likelihood given the one or more input signals of a latent user interface model and substituting the latent user interface with the active user interface model if the likelihood ratio exceeds a threshold value.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
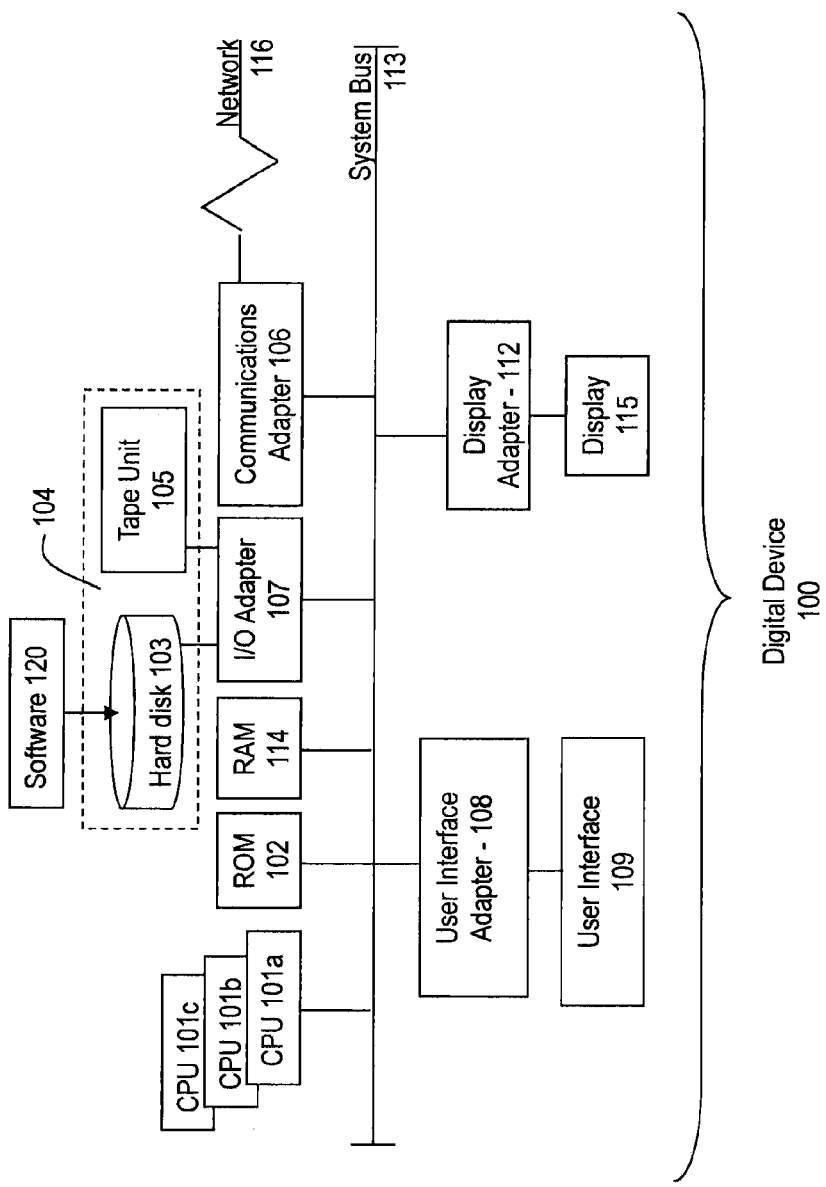
FIG. 1 is a block diagram illustrating one example of a digital device for practice of the teachings herein.

In exemplary embodiments, a digital device is provided that automatically detects a user's preference of a user interface model and adapts accordingly. The digital device is provided with a plurality of user interface models and the user interface model that is in use is referred to as the active user interface model. The user interface models which are not currently being utilized are referred to as latent user interface models. In general, a user interface model is a mapping of user interface events to system operations. For example, if a user swipes right across a user interface, then a swipe-right event is triggered and the digital device executes an action, or system operation, that is mapped to the swipe-right event. For example, in an electronic reader a swipe-right event may be mapped to an action to advance the page being viewed to the next page in a sequence. In alternate user interface models, the same trigger event may be mapped to another action or system operation. For example, in an electronic reader a swipe-right event may be mapped to an action to advance the page being viewed to the previous page in a sequence.

In exemplary embodiments, the digital device includes one or more latent user interface models and an active user interface model. While only the active user interface model is active at a time, the latent models may be running in the background. The latent user interface models may still detect input, though they do not control the operation of the digital device. In exemplary embodiments, the digital device may include a machine learning module that detects when one of the latent user interface models has a higher likelihood given the user input, than the likelihood of the currently employed active user interface model. As used herein the term likelihood refers to a statistical likelihood function where the likelihood of a set of parameter values given some observed outcomes is equal to the probability of those observed outcomes given those parameter values. In exemplary embodiment, the likelihood function may be a Bayesian likelihood function or another suitable likelihood function.

The machine learning module of the digital device may choose to switch the active user interface model as a result. The machine learning model can also incorporate additional inputs or signals to determine which user interface models a given user will find intuitive. Such additional inputs or signals may include, but are not limited to, a friend's preferences over a social network, accelerometer activity to indicate whether the user is walking, gyroscope activity to indicate the orientation of the digital device, or the like.

In one example a digital device may be an e-book reader at a library that is initially set to use an active user interface model that maps a left-right action to advance to the next page. The e-book reader may detect that a user repeatedly gestures upward at page 1, behavior that would be consistent with a latent user interface model in which an up/down action is mapped to an action to advance to the next page. After several upward gestures, the e-book reader can automatically switch the active user interface model to the latent user interface model which maps the upward gesture to the action of advancing the page. In exemplary embodiments, the switching of the active and latent user interface models on the digital device may be completely transparent, or hidden from the user, such that the user is unaware that the device has switched the active user interface model for a latent user interface model. For instance, the user may be unaware that the device initially had a left/right model, and then switched to an up/down model. In this case, the user experience may be as though the device had the "correct" model all along. In exemplary embodiments, the digital devices may include, but are not limited to, cellular phones, personal data assistants (PDAs), e-readers, tablet computers, netbooks, self-service kiosks, and the like.

Turning now to FIG. 1, there is shown an embodiment of a digital device 100 for implementing the teachings herein. In this embodiment, the device 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of the digital device 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. Hard disk 103, and tape storage device 105 are collectively referred to herein as mass storage 104. Software 120 for execution on the digital device 100 may be stored in mass storage 104. A network adapter 106 interconnects bus 113 with an outside network 116 enabling the digital device 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. One or more user interfaces 109 may be connected to bus 113 via user interface adapter 108, which may include, for example, a Super I/O chip integrating multiple device adapters into a single integrated circuit.

Thus, as configured in FIG. 1, the digital device 100 includes processing capability in the form of processors 101, storage capability including system memory 114 and mass storage 104, input means such as user interface 109, and output capability including the display 115. In exemplary embodiments, the user interface 109 and the display 115 may be integrated into a single device such as a touch screen display device. In one embodiment, a portion of system memory 114 and mass storage 104 collectively store an operating system such as the AIX® operating system from IBM Corporation to coordinate the functions of the various components shown in FIG. 1.

Figure 2:
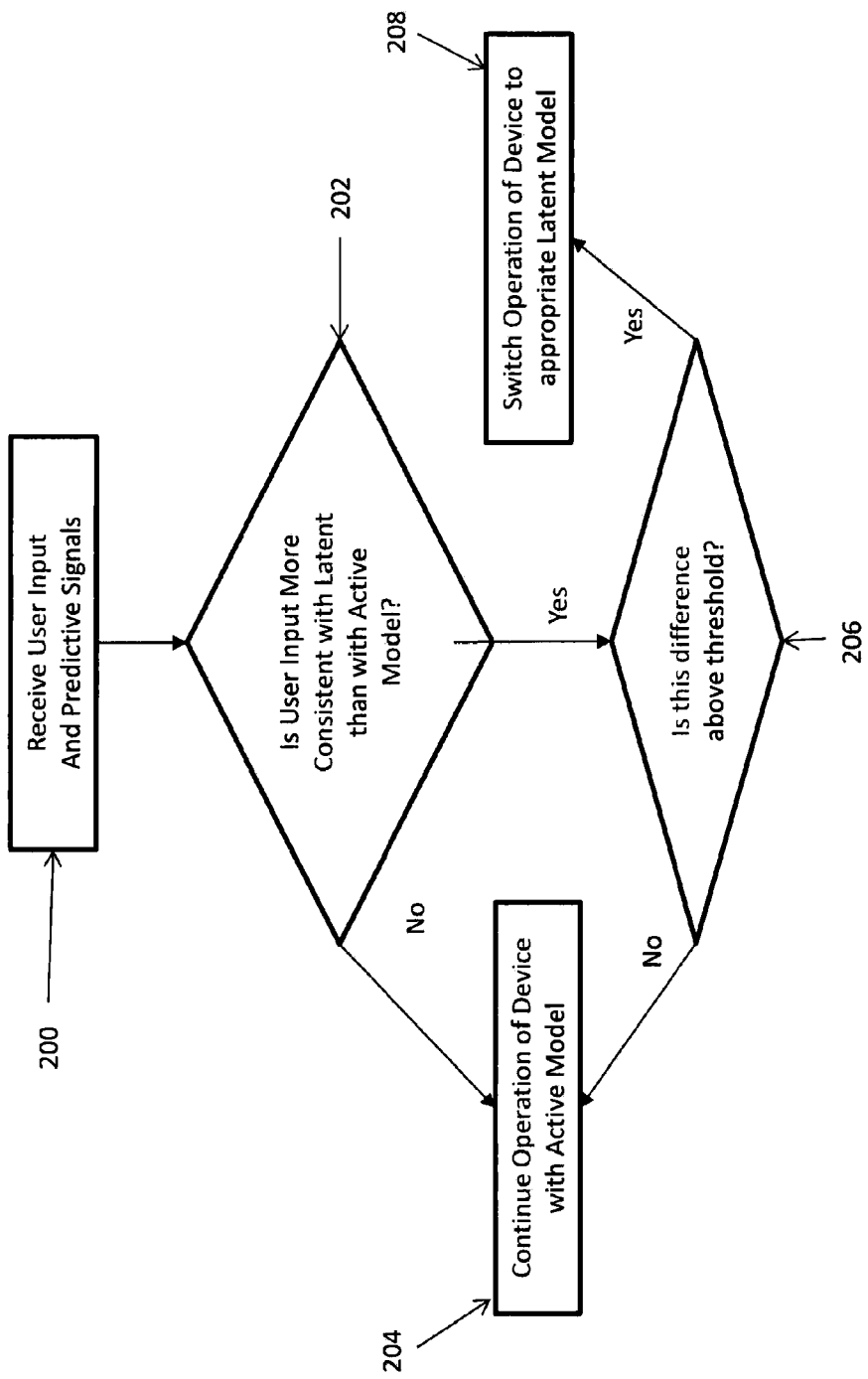
FIG. 2 is a flow chart illustrating the operation of a method for automatic detection of user preferences for alternate user interface model in accordance with an embodiment.

Referring now to FIG. 2, a flow chart illustrating the operation of a method for automatic detection of user preferences for alternate user interface model in accordance with an embodiment is shown. As shown at block 200, the method begins with operating a digital device with an active user interface model. As used herein, operating a digital device with a user interface model means employing a specific user interface model on the device, i.e., actively monitoring the user interface for specific user input and mapping the detected user input to a corresponding action of the digital device. The method also includes receiving input from a user along with other predictive signals, as shown at block 200. After the user input and predictive signals are received, as shown at decision block 202, the user input is compared with each user interface model, including both active and inactive models. In exemplary embodiments, the predictive signals may be any signal that is used by the digital device to predict what user interface model to use. For example, the predictive signal may be any signal indicative of the environment of the digital device, such as a GPS signal, a signal from a gyroscope, a signal from an accelerometer, a signal from a clock, or the like. The digital device may use one or more of these predictive signals to determine which user interface model to utilize. If the most appropriate user interface is the currently active model, then the operation of the device is continued with the active model, as shown at block 204. However, if the most appropriate user interface is not the currently active model, then the difference between the currently active model and the user input is compared to a threshold value, as shown at decision block 206. If the difference exceeds the threshold value, the operation of the device is switched to the more appropriate model, as shown at block 208.

Figure 3:
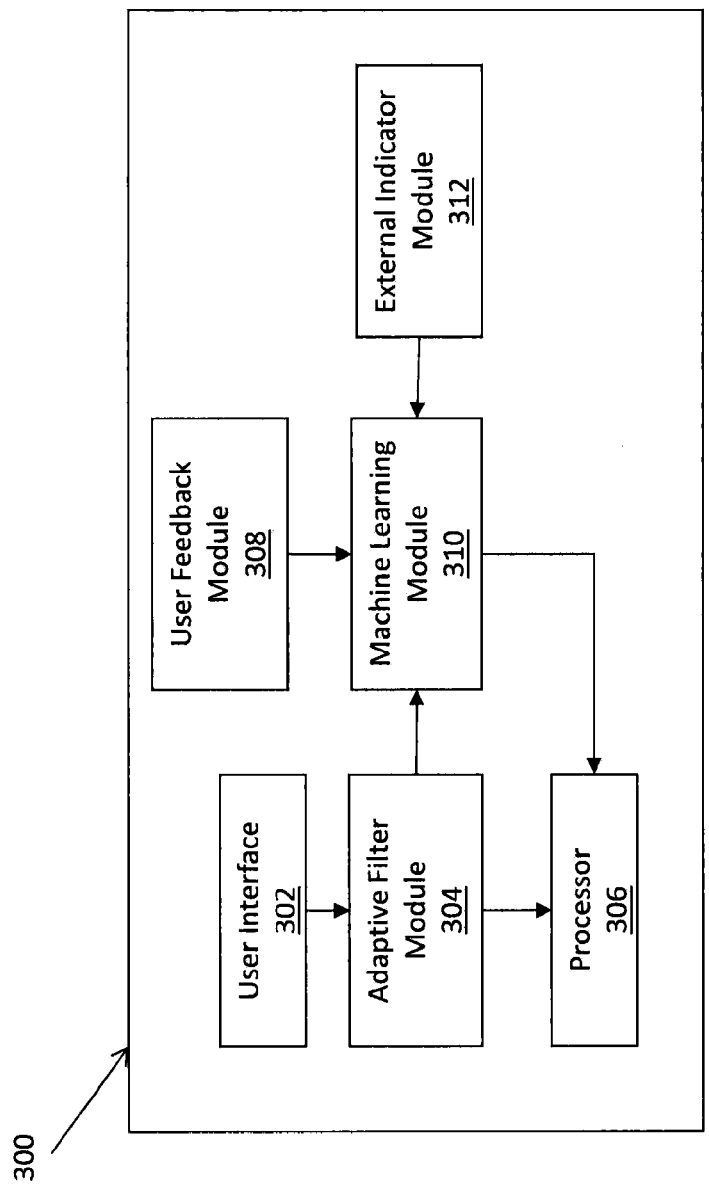
FIG. 3 is a block diagram illustrating a digital device operable for automatic detection of user preferences for alternate user interface model in accordance with an embodiment.

Referring now to FIG. 3, a block diagram illustrating a digital device 300 in accordance with an exemplary embodiment is shown. The digital device 300 may include an adaptive filter module 304 that is adapted to send only selected events received from the user interface 302 to the processor 306 for processing. For example, the adaptive filter module 304 may be designed to only forward events received from the user interface 302 that correlate to a set of mapped actions in the active user interface module to the processor 306. In exemplary embodiments, the adaptive filter module 304 can be designed to forward all events received from the user interface 302 that correlate to a mapped action in either the active user interface module or a latent user interface module to the machine learning module 310. The machine learning module 310 may maintain a probabilistic user interface model that it utilizes to select which user interface model should be the active user interface model.

The digital device 300 may also include a user feedback module 308 that is designed to register user reaction (e.g., annoyance) with the active user interface model as a feedback event that is input to the machine learning module 310. In addition, the digital device 300 may include an external indicator module 312 that registers external preferences as indicator events that are input to the machine learning module 310. The external indicator module 312 may be used to detect environmental factors that can be used select an appropriate user interface model. For example, one user interface model may be more appropriate when the user of the digital device 300 is walking vs. not-walking as detected by the digital device's accelerometer.

In exemplary embodiments, the machine learning module 310 may use a probabilistic user interface model, events received from the adaptive filter module 304 and various external factors received from the external indicator module 312 and/or the user feedback module 308 to select a user interface model that is most consistent with the events recently received from the user interface 302. The machine learning module 310 responsively instructs the processor to 306 to utilize the selected user interface model. In exemplary embodiments, the machine learning module 310 of the digital device 300 may consider the temporal relationship of the events received from the adaptive filter module 304 and various external factors received from the external indicator module 312 and/or the user feedback module 308 to aid in the selection of the user interface model that should be utilized by the digital device 300.

In exemplary embodiments, the machine learning module 310 may utilize a threshold value in selecting when to substitute one of the latent user interface models for the active user interface model. The threshold value may be a minimum ratio of the likelihood of a latent model, to the likelihood of the current model, necessary to motivate a switch. In exemplary embodiments, the threshold value can be modified by the machine learning module 310 based on environmental factors and based upon the usage history of the digital device. For example, the machine learning module 310 may utilize a lower threshold value when the digital device 300 has been dormant, or unused, for an specified period of time, referred to as a threshold time period. In another example, the machine learning module 310 may utilize a higher threshold value when the digital device 300 has been in continual use.

In exemplary embodiments, the digital device 300 may be designed to display one or more user interface control options to the user. The one or more user interface control options may include, but are not limited to, a revert button, a default button, a save button or the like. For example, the digital device 300 may automatically display a revert button, via a user interface or a display, for a set amount of time after the user interface model of the digital device 300 is changed. By selecting the revert button the user can instruct the digital device 300 to change back to the previous user interface model. In another example, the digital device may display a save default or save button to the user, which can be used to set the current user interface model to the default user interface model or to save and label the current user interface model.

Figure 4:
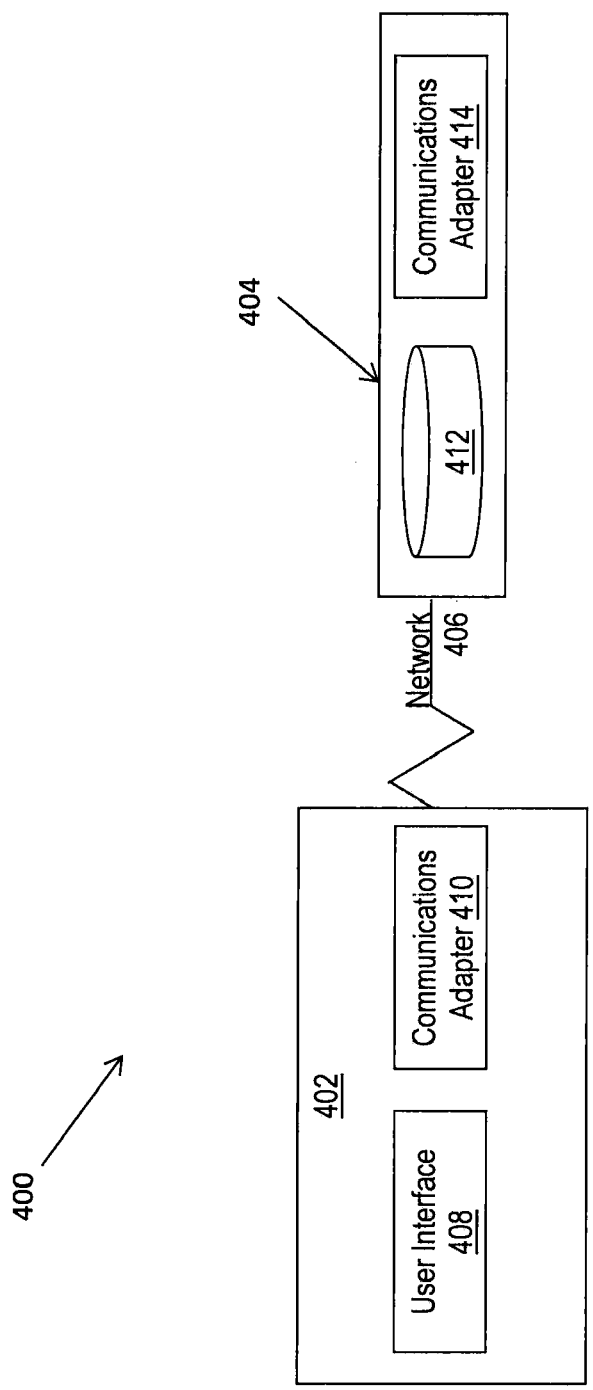
FIG. 4 is a block diagram of a system for automatic detection of user preferences for alternate user interface model in accordance with an embodiment.

Referring now to FIG. 4, a system 400 for automatic detection of user preferences for alternate user interface model in accordance with an embodiment is shown. The system 400 includes one or more digital devices 402 in communication with a server 404 via communications network 406. The digital devices 402 each include a user interface 408 for receiving input from a user and a communications adapter 410 for communicating with the server 404. The server 404 includes a user interface model database 412 and a communications adapter 414. The digital devices 402 each receive input via the user interface 408 and communicate the received input to the server 404. The server 404 compares the received user input with a plurality of user interface models stored in the user interface model database 412 and determines the user interface model with the highest likelihood given the received user input. After the determination of the appropriate user interface model is made, the server 404 may instruct the digital device 402 to use the selected user interface model.

In one embodiment, the digital device may be an electronic reading tablet with a touch screen user interface. The electronic reading tablet may be designed to have a default active user interface model which correlates a right-to-left user swipe to a command to advance the page of the book displayed. In addition, the electronic reading tablet may have a latent user interface model with correlates a bottom-to-top user swipe to a command to advance the page of the book displayed. When a user first picks up the electronic reading tablet, it will be operating with the default active user interface model. If the user repeatedly preforms a bottom-to-top swipe, the electronic reading tablet may determine that the latent user interface model better fits the user's input and then switch to operating with the latent user interface model.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
   operating, by a processor, a digital device with an active user interface model, wherein the digital device includes a touchscreen that displays a user interface comprising a layout, and wherein the active user interface model is a first mapping of input gestures to a first set of operations to be executed by a processor of the digital device in response;
   receiving a repeated series of at least one input gesture from a user of the digital device via the touchscreen;
   determining a first likelihood ratio by comparing the series of input gestures with the first set of input gestures associated with the active user interface model;

determining a second likelihood ratio by comparing the series of input gestures with a second set of input gesture associated with a latent user interface model, wherein the latent user interface model is a second mapping of input gestures to a second set of operations to be executed by the processor of the digital device in response, distinct from the first set of operations;

determining the higher likelihood ratio from the first likelihood ratio and the second likelihood ratio;

substituting the latent user interface model for the active user interface model, in response to the second likelihood ratio being higher, wherein substituting the latent user interface model does not alter the layout of the user interface; and in response to substituting the latent user interface model for the active user interface model, displaying a revert button on the touchscreen, wherein in response to a selection of the revert button the digital device reverts to the active user interface model.

2. The method of claim 1, wherein the latent user interface model is a plurality of latent user interface models, and the method further comprises, determining if one of the latent user interface models has a higher likelihood ratio than the first likelihood ratio of the active user interface models, wherein determining a likelihood ratio includes recognizing statistical properties of a sequence of user inputs that corresponds to one of the latent user interface models.

3. The method of claim 1, further comprising notifying the user before substituting the latent user interface model with the highest likelihood given the series of input gestures for the active user interface model.

4. The method of claim 1, wherein the series of input gestures are limited to input gestures received during a threshold time period.

5. The method of claim 1, further comprising soliciting input from a user to determine an initial user interface model to be used as the active user interface model.

6. The method of claim 1, further comprising receiving one or more predictive signals for use in determining if the latent user interface model has a higher likelihood ratio given the series of input gestures than the active user interface model.

7. The method of claim 1, further comprising displaying a user interface control options to the user in response to substituting the latent user interface model for the active user interface model.

8. A computer program product for automatic detection of user preferences for an alternate user interface model, the computer program product comprising:

a non-transitory computer readable storage medium for storing instructions for execution by a processing circuit for performing a method comprising:

operating a digital device with an active user interface model, wherein the digital device includes a touchscreen that displays a user interface comprising a layout, and wherein the active user interface model is a first mapping of input gestures to a first set of operations to be executed by a processor of the digital device in response;

receiving a repeated series of at least one input gesture from a user of the digital device via the touchscreen;

determining a first likelihood ratio by comparing the series of input gestures with the first set of input gestures associated with the active user interface model;

determining a second likelihood ratio by comparing the series of input gestures with a second set of input gesture associated with a latent user interface model, wherein the latent user interface model is a second mapping of input gestures to a second set of operations to be executed by the processor of the digital device in response, distinct from the first set of operations;

determining the higher likelihood ratio from the first likelihood ratio and the second likelihood ratio;

substituting the latent user interface model for the active user interface model, in response to the second likelihood ratio being higher, wherein substituting the latent user interface model does not alter the layout of the user interface; and in response to substituting the latent user interface model for the active user interface model, displaying a revert button on the touchscreen, wherein in response to a selection of the revert button the digital device reverts to the active user interface model.

9. The computer program product of claim 8, wherein the latent user interface model is a plurality of latent user interface models, and the method further comprises, determining if one of the latent user interface models has a higher likelihood ratio than the first likelihood ratio of the active user interface models, wherein determining a likelihood ratio includes recognizing statistical properties of a sequence of user inputs that corresponds to one of the latent user interface models.

10. The computer program product of claim 8, further comprising notifying the user before substituting the latent user interface model with the highest likelihood given the series of input gestures for the active user interface model.

11. The computer program product of claim 8, wherein the series of input gestures are limited to input gestures received during a threshold time period.

12. The computer program product of claim 8, further comprising soliciting input from a user to determine an initial user interface model to be used as the active user interface model.

13. The computer program product of claim 8, further comprising receiving one or more predictive signals for use in determining if the latent user interface model has a higher likelihood ratio given the series of input gestures than the active user interface model.

14. The computer program product of claim 8, further comprising displaying a user interface control option after substituting the latent user interface model for the active user interface model.

15. A method for operating a digital device comprising:

operating a user interface of the digital device with an active user interface model, wherein the digital device includes a touchscreen that displays a user interface comprising a layout, and wherein the active user interface model is a first mapping of said user interface to a first set of operations to be executed by a processor of the digital device in response to input gestures from the user;

receiving a repeated series of at least one input gesture from a user of the digital device via the user interface;

calculating a correlation value between the series of input gestures with a latent user interface model wherein the latent user interface model is a second mapping of said user interface to a second set of operations to be executed by the processor of the digital device in response to the input gestures, the second set of operations being distinct from the first set of operations;

substituting the active user interface model with the latent user interface model in response to the correlation value exceeding a threshold value, wherein substituting the latent user interface model does not alter the layout of the user interface; and in response to substituting the latent user interface model for the active user interface model, displaying a revert button on the touchscreen, wherein in response to a selection of the revert button the digital device reverts to the active user interface model.

16. The method of claim 15, wherein the threshold value is adjusted to a minimum value when the digital device has been dormant for a threshold time period.

17. The method of claim 15, further comprising notifying the user before substituting the active user interface model with the latent user interface model.

18. The method of claim 15, further comprising soliciting input from a user to determine an initial user interface model to be used as the active user interface model.

19. The method of claim 15, further comprising displaying a user interface control option after substituting the latent user interface model for the active user interface model.

* * * * *